United States Patent Office 3,442,763
Patented May 6, 1969

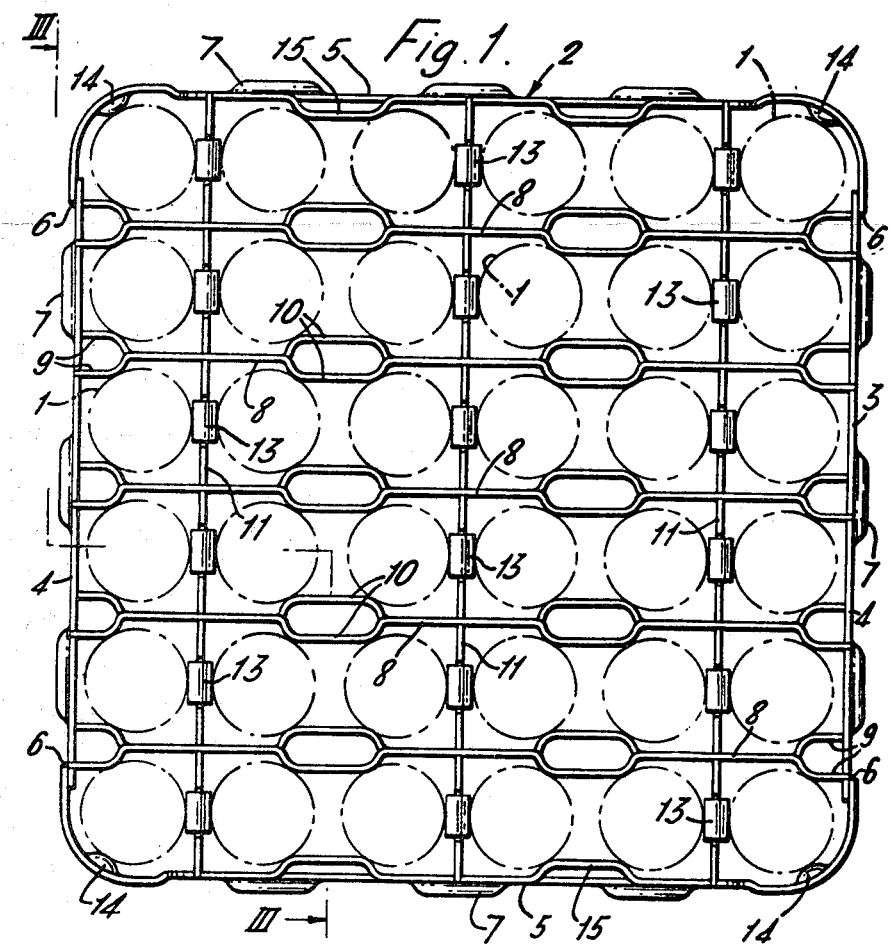
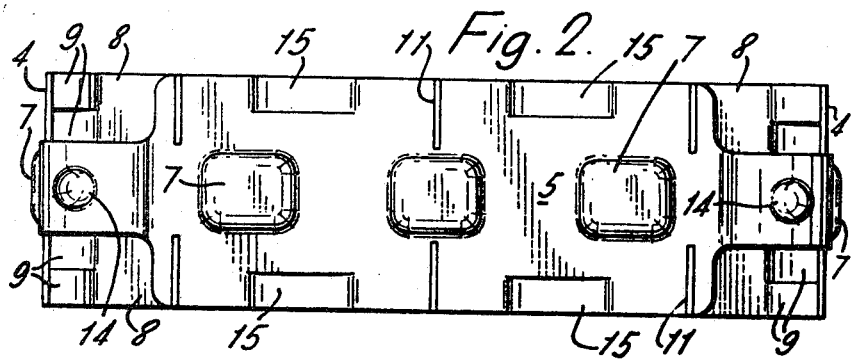

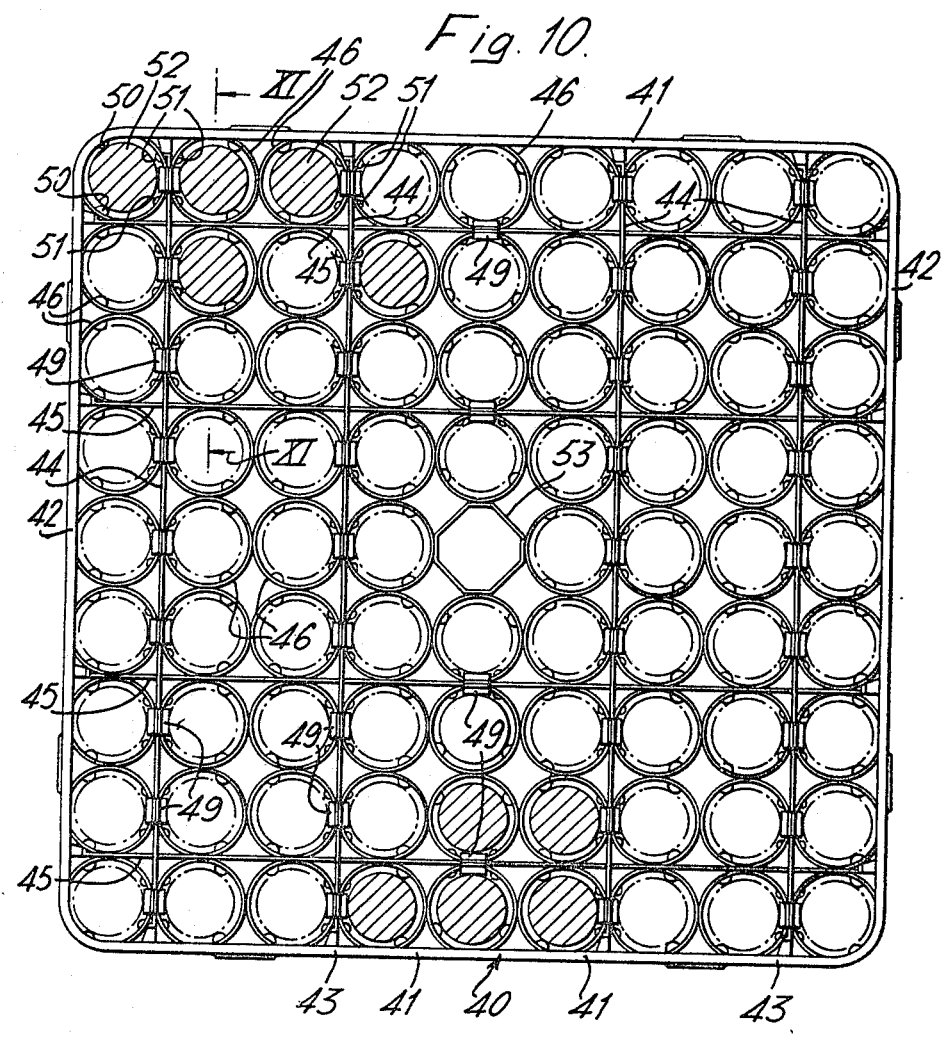

3,442,763
NUCLEAR REACTOR FUEL ELEMENT ASSEMBLIES
John Chetter, Lytham, Lytham St. Annes, and Cecil Henry Jones, St. Annes on Sea, England, assignors to United Kingdom Atomic Energy Authority, London, England
Filed July 14, 1967, Ser. No. 653,426
Claims priority, application Great Britain, July 21, 1966, 32,911/66; Mar. 8, 1967, 11,018/67
Int. Cl. G21c 3/34
U.S. Cl. 176—78
11 Claims

ABSTRACT OF THE DISCLOSURE

A spacer grid for a nuclear fuel assembly of cellular form with a square framework, in which the cells are penetrated by fuel pins, each pin being positioned in its cell by two spaced stop means and a resilient means arranged so that the resilient means is positioned at the apex of an isosceles triangle relative to the stop means which are positioned at the basal corners of the isosceles triangle. The points of contact of the stop and resilient means with the fuel pins lying in the plane of the grid structure.

Background of the invention

This invention relates to nuclear reactor fuel assemblies and in particular to that kind of fuel element assembly including a plurality of elongate fuel pins supported in a bundle with their longitudinal axes parallel. Such a fuel element assembly employs one or more spacer grids disposed intermediate the ends of the assembly and serving to retain the correct location of the fuel pins in the assembly relative to one another.

Summary of the invention

According to the invention, a nuclear reactor fuel assembly of the hereinbefore specified kind has at least one spacer grid comprising a grid structure of cellular form, the cells of the grid structure being penetrated by fuel pins, the grid structure defining two spaced stop means for each fuel pin in the plane of the grid structure, resilient means carried by the grid structure to hold each fuel pin against the spaced stop means, the resilient means for folding each fuel pin being positioned at the apex of an isosceles triangle relative to the spaced stop means which are positioned at the basal corners of the isosceles triangle, the points of contact of the stop means and the resilient means with the fuel pins lying in the plane of the grid structure.

In one form of spacer grid in accordance with the invention the grid structure is formed from a series of parallel strips of material crossing with another series of parallel strips of material to define cells of rectangular form, which are penetrated by the fuel pins, resilient means being carried by at least one wall of each of the rectangular cells of the grid structure, each of said resilient means holding an associated fuel pin against stop means defined by the two walls of the rectangular cell adjacent the wall of the cell carrying the resilient means.

Description of the drawings

Embodiments of the invention will now be described by way of example with reference to the accompanying drawings in which:

FIGURE 1 is a plan view of a spacer grid for a nuclear reactor fuel element assembly, FIGURE 2 is a front elevation of the grid shown in FIGURE 1.

FIGURE 10 is a plan view of a third form of spacer grid for a nuclear reactor fuel assembly.

Description of the preferred embodiments

Figure 3:
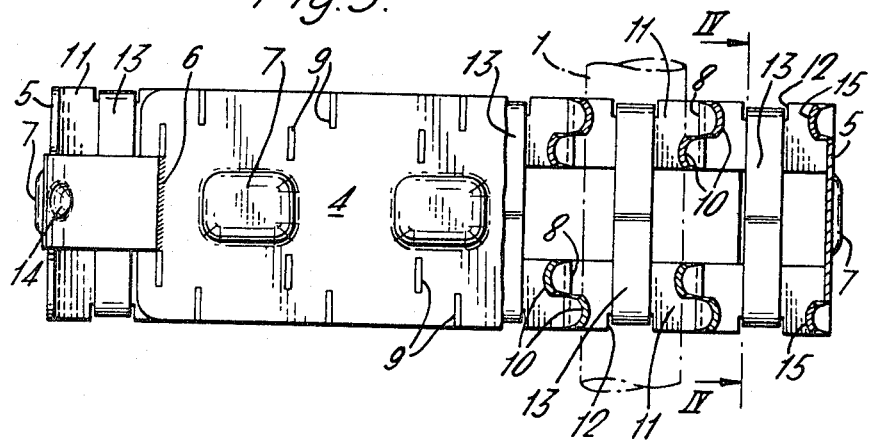
FIGURE 3 is an end view partly in section on line III—III of FIGURE 1.
Figure 4:
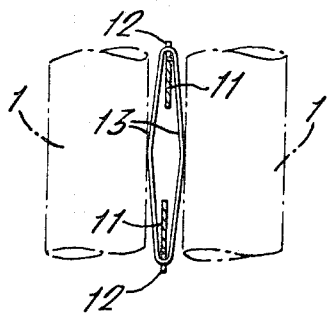
FIGURE 4 is a detached section on line IV—IV of FIGURE 3 and illustrates a detail.

In the drawings the forms of spacer grid shown are for a nuclear reactor fuel assembly which is of the boxed type intended for employment with other assemblies in aggregation to form the core of a water reactor. The fuel element assembly employs pins arranged parallel to one another in a cluster, each fuel pin being of full core height and consisting of a stack of pellets of ceramic fissile material enclosed in a sheath of suitable metallic material such as a zirconium base alloy.

In FIGURES 1-5 of the drawings the spacer grid shown maintains an assembly of fuel pins 1 in their correct lateral positions, there also being an upper and a lower support grid (not shown) for carrying the weight of the fuel and for retaining the pins 1 in their correct axial position. The spacer grid 2, of which there may be more than one, has a generally square framework 3 fabricated from four parts, two parts 4 being plane side parts and the other two parts 5 being side and corner parts, the four parts being welded together at 6 as can be seen by reference to FIGURES 1 and 3. The parts 5 have curved ends of reduced diameter which form rounded corners of the framework 3. All the framework parts are provided with spaced outward bulges 7 which contact the box of the assembly (not shown) and space the grid 2 from the walls thereof. The curved ends of the parts 5 are each centrally dimpled about half way around the curve, providing an inwardly extending projection 14. Furthermore, the framework parts 5 are each split at two spaced positions and at two levels and the material upset to provide inwardly extending loops 15 which are curved in cross-section, as can clearly be seen in FIGURES 1, 2 and 3. The framework parts 4 and 5 are of stainless steel strip edge-on to coolant flow.

The framework 3 carries a plurality of equal width (but less than half of the main width of the framework strip material) strips extending across the framework in parallel relationship with the sides thereof. At the crossing points of the strips, each strip is slotted (see FIGURE 5) to half its width so that the strips can cross at the same level in eggbox manner, tack welding being employed to secure the strips together at the crossing points. The ends of the strips are carried in slots in the framework so as to finish flush with the outer surface thereof, and are welded thereto. There are upper and lower sets of strips so as to provide a spaced two position support for each fuel pin.

Figure 5:
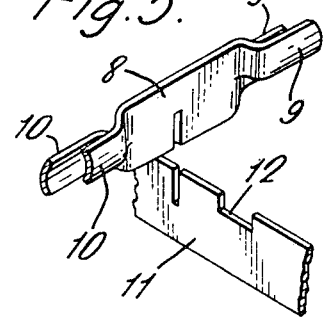
FIGURE 5 is a fragmentary exploded perspective view and illustrates another detail.

In detail, strips 8, extending at two levels across the framework between the framework parts 4, are each of stainless steel edge-on to coolant flow and are split and opened centrally longitudinally at their ends and at two intermediate positions so as to provide forks 9 at the ends and upper and lower loops 10 intermediately, the forks 9 and loops 10 projecting outwardly from the sides of the strip 8 and being curved in cross-section, see FIGURE 5. There are five equi-spaced strips 8 at each of the two levels.

Three strips 11 also of stainless steel and edge-on to coolant flow, extend at each of two levels across the framework 3 between the framework parts 5. The strips 11 are spaced so as to extend between the first and second, third and fourth, and fifth and sixth row of fuel pins 1 (there being thirty six fuel pins arranged in a 6 x 6 square), whereas the strips 8 extend between each of the six rows of fuel pins in the perpendicular direction. The strips 11 are provided with recessed portions 12 at six equi-spaced positions along their length, each of these positions registering with the centre of a fuel pin. The recessed portions 12 are formed in the top edges of the upper level of strips 11, and in the lower edges of the lower level of strips 11. The registering recessed portions 12 at both levels at each spaced position serve to accommodate and locate a looped spring member 13, shown particularly in FIGURES 1, 3 and 4, which projects outwardly from the sides of the strips 11 and functions as a double leaf spring. The material employed for the spring member is for example the nickel alloy known as Inconel.

It will be seen from FIGURE 3 in particular that the described arrangement provides support for each fuel pin 1 at two levels. Considering for example a fuel pin 1 in the central region of the grid as shown in FIGURE 1, it will be seen that the pin is urged by a spring member 13 against two spaced stops at two levels provided by the loops 10 of adjacent strips 8. The same spring member 13 also urges an adjacent pin against a further pair of loops 10 at two levels of the same adjacent strips. The spring member 13 bears on the fuel pins at a level intermediate the levels at which the loops 10 contact the pins. This provision serves to "spread" the contacting of the pins from contact only at a single or double level, and hence reduces the possibility of hot spot failure of the sheathing material of the pins. The outside rows of fuel pins adjacent the framework parts 4 are urged by spring members 13 against limbs of adjacent forks 9 at two levels, or, in the case of the corner fuel pins, against one limb of a fork 9 at two levels and against the projection 14 at a single level. The fuel pins in the outside rows of fuel pins adjacent the framework parts 5 are each urged by a spring member 13 against a loop 10 of a strip 8 at two levels and against a loop 15 of the framework part 5, also at two levels.

The spacer grid may be secured or located relative to the box of the respective fuel element assembly. Alternatively, the spacer grid may be secured to a selected number of fuel pins, for example the corner fuel pins, in which case the means shown and described herein for the positioning of the corner fuel pins is replaced by a suitable securing expedient, for example that shown and described in our co-pending British application No. 20,221/65.

Figure 6:
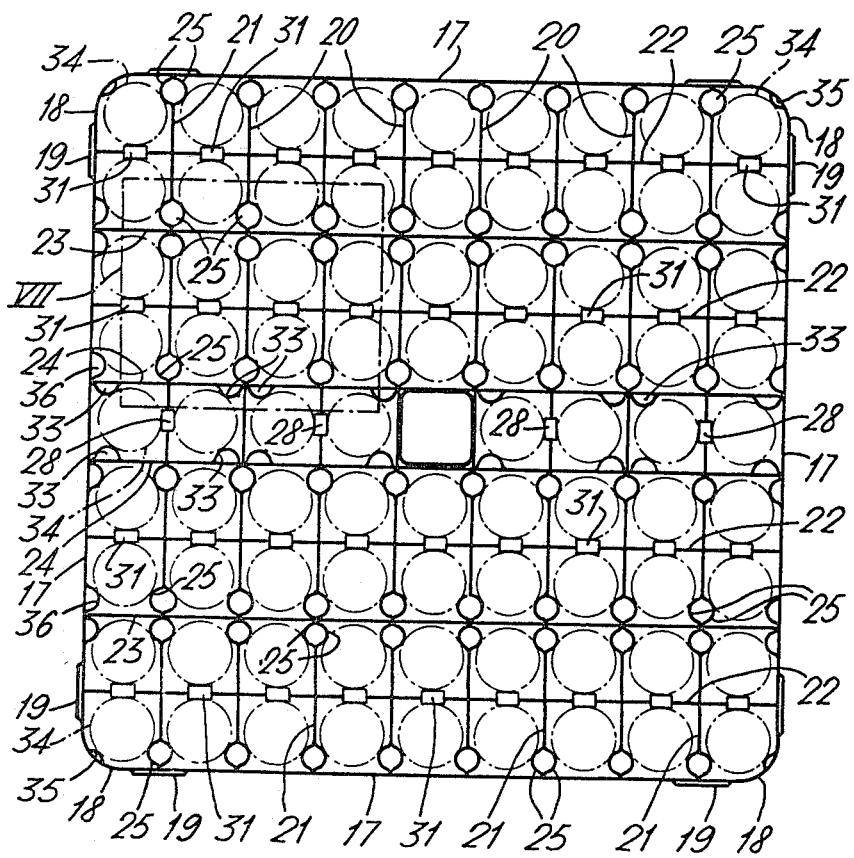
FIGURE 6 is a schematic plan view of a second form of spacer grid for a nuclear reactor fuel assembly.
Figure 7:
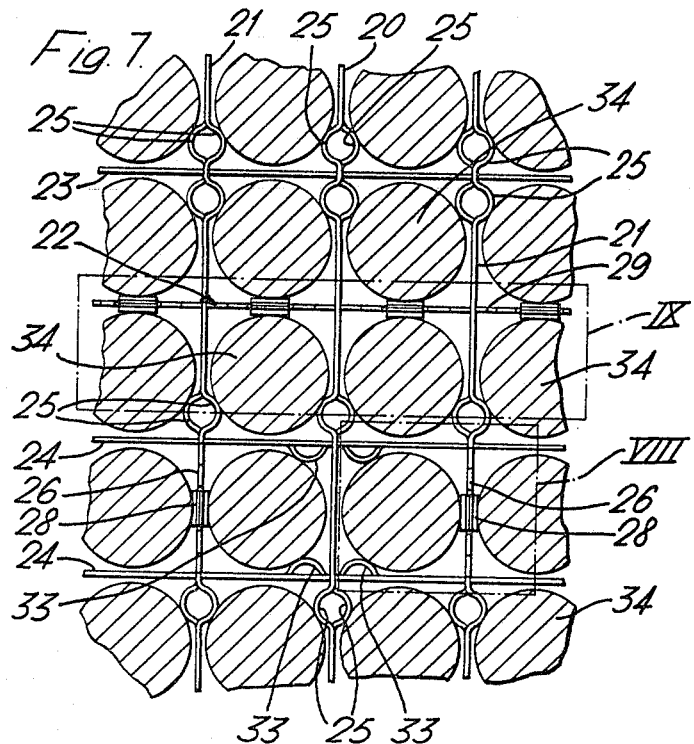
FIGURE 7 is a detail of the area bounded by the chain dotted rectangle VII in FIGURE 6.

The second form of spacer grid shown in FIGURES 6, 7, 8 and 9 comprises a generally square framework 16 also fabricated from four side parts 17 and four curved corner parts 18, the side parts 17 being joined with the corner parts 18 by welding together of overlapping ends 19 as can be seen in FIGURE 6. The framework 16 carries a plurality of strips 20, 21, 22, 23 and 24, extending across the framework 16 in parallel relationship with the sides thereof. At the crossing points of the strips each strip is slotted to half its width so that the strips cross at the same level in egg box manner, tack welding being employed to secure the strips together at the crossing points. The ends of the strips are carried in slots in the framework so as to finish flush with the outer surface thereof and are welded thereto.

Figure 8:
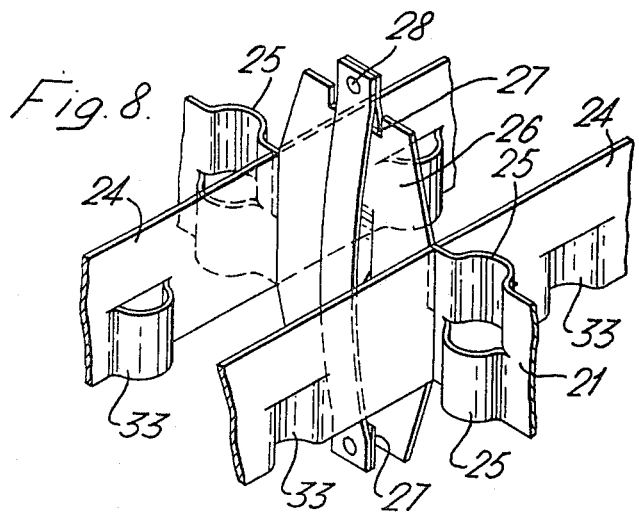
FIGURE 8 is a fragmentary perspective view of the area bounded by the chain dotted rectangle VIII in FIGURE 7.
Figure 9:
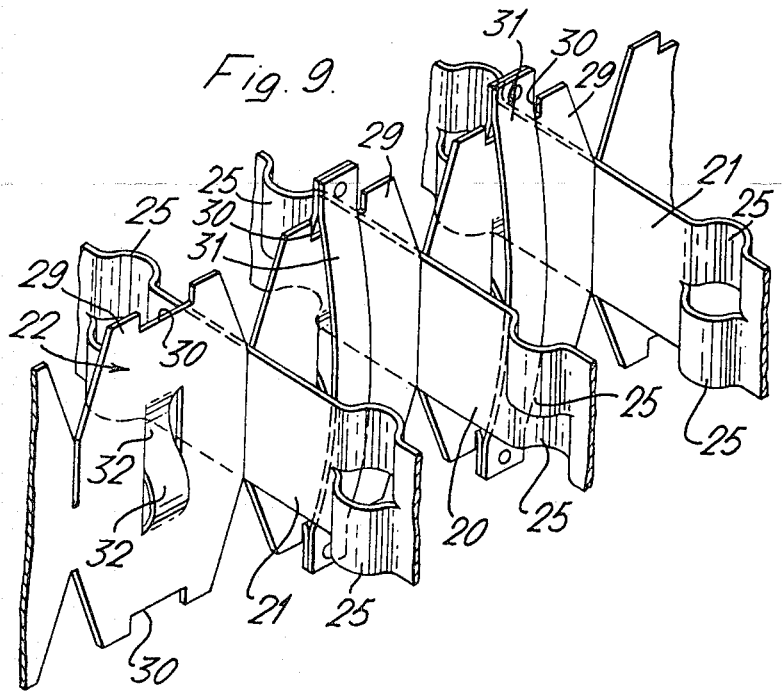
FIGURE 9 is a fragmentary perspective view of the area bounded by the chain dotted rectangle IX in FIGURE 7.

In detail the strips 20 are of stainless steel edge on to the coolant flow and are of similar depth to the depth of the framework parts 17 and 18. The strips 20 are split at spaced positions along their length, and the material upset at each position on either side of the strip at two levels to provide loops 25 projecting from either side of the strips 20. The loops 25 are curved in cross section, as can be seen in FIGURE 9. The strips 21 are similar to the strips 20 having similarly projecting loops 25. However as can be seen in FIGURE 8 each of the strips 21 has a central lozenge shaped section 26 which is greater in depth than the depth of the strips 21. The central section 26 of each strip 21 has recesses 27 formed in its upper and lower longitudinal edges. The recesses 27 serve to accommodate and locate a looped spring member 28, which as shown in FIGURE 8 comprises two bow springs spot welded together at their ends one of the bow springs extending each side of the central section 26 of the strip 21. The material employed for the spring member 28 is, for example, the nickel alloy known as Inconel. As shown in FIGURE 9 the strips 22 comprise a series conformed lozenge shaped sections 29 similar to the central section 26 of the strips 21. Likewise to the central sections 26 of the strips 21 the sections 29 of the strips 22 have recesses 30 in their upper and lower edges which serve to accommoate and locate looped spring members 31. Each of the sections 29 of the strips 22 is slotted longitudinally and the material upset to form two loops 32 extending from opposite faces of the sections 29 of the strips 22. The loops 32 serve as spreaders for the spring members 31. The strips 23 are of plain form and the strips 24 are also basically of plain form but are split at spaced positions along their length and the material upset on one side of the split to provide loops 33 which project on one side of the strips 24. As can be seen in FIGURE 8 the loops 33 are of curved cross section.

In one direction across the structure the strips are arranged as follows: a strip 21, a strip 20, a strip 21, two strips 20, a strip 21, a strip 20 and finally a strip 21. In the other direction across the structure the strips are arranged as follows: a strip 22, a plain strip 23, a strip 22, two strips 24, a strip 22, a plain strip 23 and a strip 22. The strips form 81 cells each of which is penetrated by a fuel pin 34. The bulk of the cells are defined by the four strips 20, 21, 22 and 23. For example the second cell in the second horizontal row of the structure as shown in FIGURE 6, which is typical of the bulk of the cells in the structure, is defined between two parallel strips 20 and 21 crossed by two parallel strips 22 and 23. The fuel pin 34 penetrating this cell is located by the associated looped spring member 31 of the strip 22 against the associated loops 25 of the strips 20 and 21.

The central horizontal row of cells in the structure shown in FIGURE 6 is defined by the two parallel strips 24 crossed alternately by the strips 20 and 21. For example the second cell in the central horizontal row of cells is defined between the two parallel strips 24 crossed by a strip 21 and a strip 20. The fuel pin 34 penetrating this cell is located against the associated loops 33 of the parallel strips 24 by the looped spring member 28 carried by the strip 21.

The fuel pins 34 penetrating the corner cells of the framework 16 are located by the end spring member 31 of the associated strip 22. The spring member 31 locates the fuel pin 34 against the end loop 25 on the associated strip 21 and a loop 35 projecting inwardly from the associated corner piece 18 of the framework 16.

The fuel pins 34 penetrating the outer rows of cells adjacent the two vertical side parts 17 of the framework 16 in FIGURE 6 are located by the end spring members 31 of the strips 22. The spring member 31 locates the fuel pins 34 against the associated loops 25 of the strips 21 which run parallel to the side members 17 of the framework 16 and against loops 36 formed projecting inwardly from the side members 17.

It is a characteristic of the spacer grid shown in FIGURES 6–9 that end fuel pin 34 is located by a looped spring member against two fixed loop members defined by the structural members of the grid, the looped spring member being located at the apex and the two fixed loop members being located at the based corners of an isosceles triangle.

Figure 11:
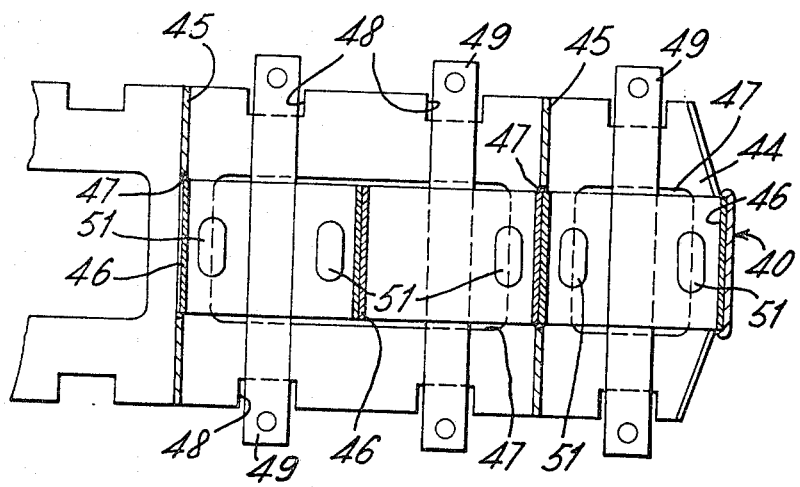
FIGURE 11 is a detail section along the line XI—XI in FIGURE 10.

The third form of spacer grid shown in FIGURES 10 and 11 comprises a square framework 40 fabricated from two members 41. The members 41 have sides 42 and arms 43 and are joined by overlapping and brazing of the arms 43. Four parallel strips 44 extend across the framework 40 in one direction and four parallel strips 45 extend across the framework 40 in the other direction. At the crossing point of the strips 44 and 45 each strip is slotted to half its width so that the strips 44 and 45 cross at the same level in egg box manner, tack welding being employed to secure the strips together at their crossing points. At their ends the strips 44 and 45 are secured to the framework 40 by brazing. The strips 44 and 45 define a number of rectangular cells in the framework 40 and each of the cells is fitted with a number of tubular ferrules 46. The ferrules 46 are in point to point contact in the cells and the strips 44 and 45 have slots 47 so that neighbouring ferrules 46 in adjacent cells contact each other. Throughout the structure adjacent ferrules 46 are brazed to each other at their points of contact. As shown in FIGURE 11 the strips 44 have recesses 48 formed in their upper and lower longitudinal edges. The recesses 48 serve to accommodate and locate looped spring members 49. Each spring member 49 comprises two bow springs one on each side of the strip member 44 and spot welded together at their ends. The bow springs of each spring member 49 pass through the associated ferrules 46 on each side of the strip members 44. The strip members 45 are of plain form but each is fitted with a spring member 49 at its centre. Four dimples are formed internally in each ferrule 46 there being two large dimples 50 opposite to the spring members 49 carried by the strips 44 and two smaller dimples 51 adjacent the spring members 49. In the case of the ferrules 46 associated with the spring members 49 carried at the centre of the strips 45, these are turned through 90° so that in the case of these ferrules also the large dimples 50 are opposite to the spring members 48 carried by the strips 45 and the small dimples 51 are adjacent the spring members 48.

Each of the ferrules 46 is penetrated by a fuel pin 52. The fuel pins 52 are located by the spring member 48 associated with each ferrule 46. The spring members 49 hold the fuel pins 52 located against the large dimples 50 of the associated ferrules 46. The small dimples in the ferrules 46 serve to limit movement of the fuel pins 52 against the action of the spring members 48. The ferrules 46 of the centre cell are fitted round a central octagonal ferrule 53, this central ferrule 53 being unoccupied by a fuel pin.

In the three forms of spacer grid described above the spring members shown in FIGS. 1 to 5, 6 to 9, 10 and 11 are in the form of a double bow spring effective on two adjacent fuel pins in the fuel assembly. The spring members are symmetrical double elliptical springs of constant thickness.

It is thought that, whilst satisfactory from the point of view of achieving the desired location of the fuel pins in the spacer grid, the double elliptical spring of constant thickness may give rise to problems involving interference with the coolant flow pattern, specifically the formation of a coolant void downstream of the contact point between pin and spring, which could produce a local hot spot in the sheath of the fuel pin, which would be undesirable as it can materially affect the integrity of the sheath in that area.

Figure 12:
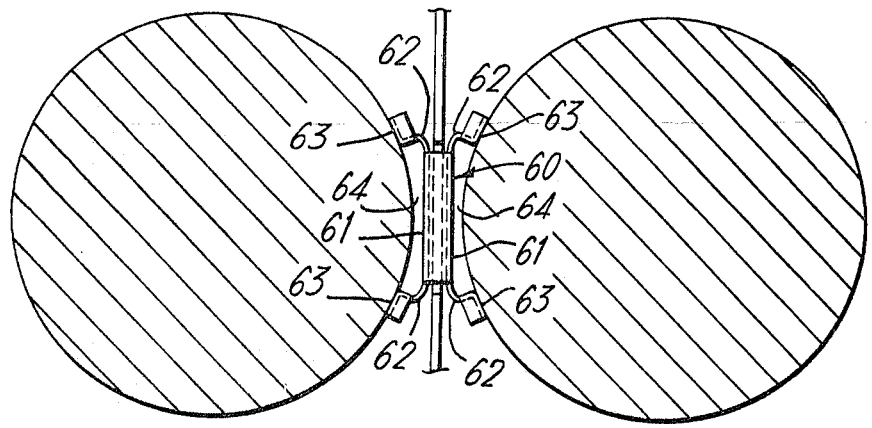
FIGURE 12 is a detached plan view of a modified feature of the spacer grids shown in FIGURES 1, 6 and 10.
Figure 13:
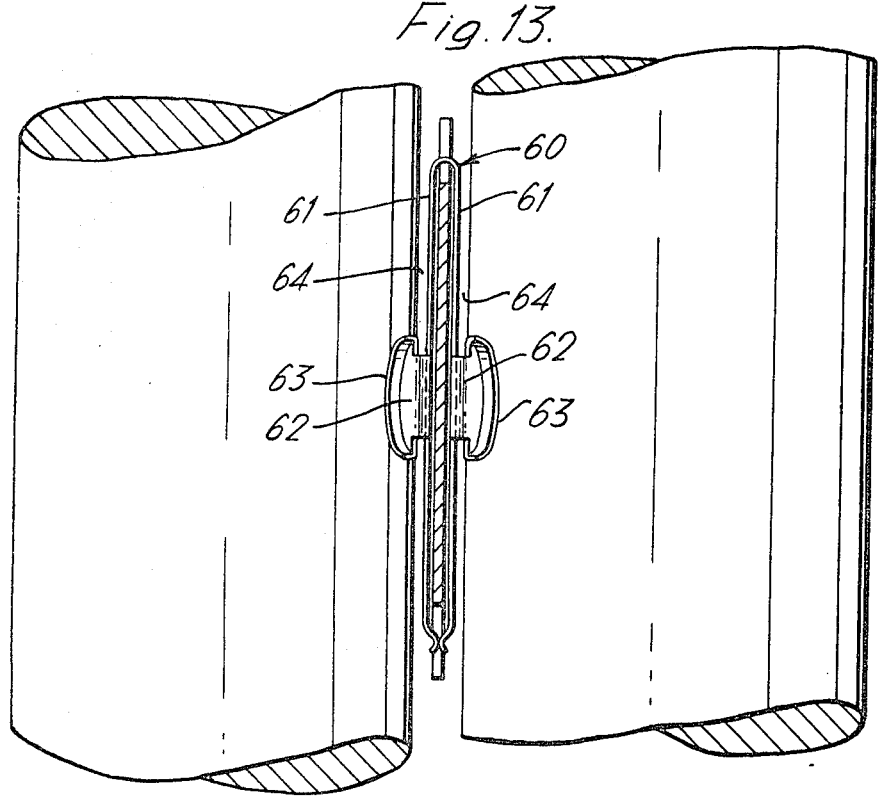
FIGURE 13 is a side elvation of FIGURE 11.

FIGURES 12 and 13 of the accompanying drawings illustrate an alternative form of spring member. The spring member comprises a double limbed spring 60 which may as shown be in the form of a single length with ends abutting, or alternatively may be a closed loop as shown in FIGS. 1–5 of the accompanying drawings or in the form of two bow springs spot welded together at their ends as shown in FIGS. 6 to 9 of the accompanying drawings. The spring 60 encircles a grooved strip of the grid structure and has on each limb 61 a pair of laterally extending integral arms 62 each provided with curved contact surfaces 63 providing for surface contact with the sheaths of a pair of adjacent fuel pins. The areas of contact are outside the width of the limbs 61 of the spring 60 and thus provide passages 64 for coolant to flow between the limbs 61 and the sheaths of the fuel pins. Frictional engagement between the contact surfaces 63 and the fuel pin sheaths is intended to prevent the pins sliding relative to the springs 60; the fact that the springs 60 can move longitudinally relative to the grooved parts of the grid structure allows for thermal expansions and contractions of the fuel pins relative to the grid, which is fixed.

Since the contact positions of the spring member with the respective fuel pin are separated by more than the width of the main body of the spring, a continuous film of coolant can exist between the main body of the spring and the surface of the fuel pin, whereby avoiding the undesirable effects which follow from interference with the coolant flow pattern downstream of the spring member.

We claim:

1. A spacer grid for a nuclear reactor fuel assembly of the kind including a plurality of elongate fuel pins supported in a bundle with their longitudinal axes parallel, said spacer grid comprising a grid structure of cellular form, the cells of the grid structure being of rectangular form and being penetrated by fuel pins, the grid structure defining two spaced stop means for each fuel pin in the plane of the grid structure, resilient means carried by the grid structure to hold each fuel pin against the spaced stop means, the resilient means for holding each fuel pin being positioned at the apex of an isosceles triangle relative to the spaced stop means which are positioned at the basal corners of the isosceles triangles, the points of contact of the stop means and the resilient means with the fuel pins lying in the plane of the grid structure.

2. A spacer grid for a nuclear reactor fuel assembly as claimed in claim 1 wherein the grid structure is formed from a series of parallel strips of material crossing with another series of parallel strips of material to define cells of rectangular form, which are penetrated by the fuel pin means, resilient means being carried by at least one wall of each of the rectangular cells of the grid structure, each of said resilient means holding an associated fuel pin against stop means defined by the two walls of the rectangular cell adjacent the wall of the cell carrying the resilient means.

3. A spacer grid for a nuclear reactor fuel assembly as claimed in claim 2 wherein the grid structure defines cells of rectangular form having two short end walls and two long side walls, each cell of the grid structure being penetrated by two fuel elements, resilient means carried by each end wall of each cell in the grid structure each of said resilient means holding one of the two fuel pins penetrating the cell against stop means defined by the side walls of the cell, the stop means defined by the side walls of each cell being common to both fuel pins penetrating that cell.

4. A spacer grid for a nuclear reactor fuel assembly as claimed in claim 2 wherein each resilient means serves to urge apart two adjacent fuel pins in neighboring cells of the grid structure so that the two fuel pins are held against the stop means defined by the walls of the cells penetrated by the fuel pins, said resilient means being carried by the cell wall of the grid structure which is common to the neighbouring cells.

5. A spacer grid for a nuclear reactor fuel assembly as claimed in claim 4 wherein the resilient means for urging each two adjacent fuel pins apart comprises two bow springs joined at each end to form a looped spring member of elliptical form, the looped spring member thus formed embracing the cell wall of the grid structure which is common to the neighboring cells penetrated by the two adjacent fuel pins, each of the bow springs forming the looped spring member bearing against one of the adjacent fuel pins.

6. A spacer grid for a nuclear reactor fuel assembly as claimed in claim 1 wherein the grid structure is formed from an assembly of cojoined tubular ferrules, each of the ferrules being penetrated by a fuel pin, two spaced stop means being provided projecting inside each ferrule, resilient means acting in each ferrule to urge the fuel pin penetrating that ferrule against the spaced stop means, the resilient means being positioned at the apex of an isosceles triangle relative to the stop means which are positioned at the basal corners of the isosceles triangle, the points of contact of the stop means and the resilient means with the fuel pins lying in the plane of the grid structure.

7. A spacer grid for a nuclear reactor fuel assembly as claimed in claim 6 wherein each resilient means serves to urge apart the fuel pins penetrating two adjacent ferrules in the grid structure whereby the fuel pins are held against the stop means in the two adjacent ferrules.

8. A spacer grid for a nuclear reactor fuel assembly as claimed in claim 7 wherein the resilient means for urging apart the fuel pins in two adjacent ferrules comprises two bow springs joined at each end to form a looped spring member of elliptical form, the looped spring member embracing the two adjacent ferrules around their point of contact, each of the bow springs forming the looped spring member bearing against one of the fuel pins penetrating the adjacent ferrules.

9. A spacer grid for a nuclear reactor fuel assembly as claimed in claim 3 wherein each resilient means serves to urge apart two adjacent fuel pins in neighboring cells of the grid structure so that the two fuel pins are held against the stop means defined by the walls of the cells penetrated by the fuel pins, said resilient means being carried by the cell wall of the grid structure which is common to the neighbouring cells.

10. A spacer grid for a nuclear reactor fuel assembly as claimed in claim 5, wherein each bow spring of the resilient means for urging each two adjacent fuel pins apart has laterally projecting arms arranged with contact surfaces at the ends thereof and intended to contact the related fuel pin at positions separated from one another by more than the width of the bow spring.

11. A spacer grid for a nuclear reactor fuel assembly as claimed in claim 8, wherein each bow spring of the resilient means for urging each two adjacent fuel pins apart has laterally projecting arms arranged with contact surfaces at the ends thereof and intended to contact the related fuel pin at positions separated from one another by more than the width of the bow spring.

References Cited

UNITED STATES PATENTS

| 3,228,854 | 1/1966 | Bekkering et al. | 176—78 |
| 3,298,922 | 1/1967 | Prince et al. | 176—76 X |
| 3,301,764 | 1/1967 | Timbs et al. | 176—76 X |
| 3,301,765 | 1/1967 | Eyre et al. | 176—76 X |
| 3,314,860 | 4/1967 | Wilman | 176—78 |
| 3,350,275 | 10/1967 | Venier et al. | 176—78 |
| 3,369,973 | 2/1968 | Voigt et al. | 176—78 |
| 3,377,254 | 4/1968 | Frisch | 176—78 |
| 3,379,617 | 4/1968 | Andrews et al. | 176—78 |

FOREIGN PATENTS

| 1,082,679 | 6/1960 | Germany. |
| 1,104,082 | 4/1961 | Germany. |
| 962,266 | 7/1964 | Great Britain. |

BENJAMIN R. PADGETT, *Primary Examiner.*

M. J. SCOLNICK, *Assistant Examiner.*

U.S. Cl. X.R.

176—76